US009131238B2

(12) United States Patent
Bursalioglu Yilmaz et al.

(10) Patent No.: US 9,131,238 B2
(45) Date of Patent: Sep. 8, 2015

(54) SYSTEM AND METHOD FOR LOSSY SOURCE-CHANNEL CODING AT THE APPLICATION LAYER

(75) Inventors: Ozgun Bursalioglu Yilmaz, Los Angeles, CA (US); Giuseppe Caire, South Pasadena, CA (US); Maria Fresia, Munich (DE); Harold Vincent Poor, Princeton, NJ (US)

(73) Assignees: The Trustees of Princeton University, Princeton, NJ (US); University of Southern California, Los Angeles, CA (US)

( * ) Notice: Subject to any disclaimer, the term of this patent is extended or adjusted under 35 U.S.C. 154(b) by 449 days.

(21) Appl. No.: 13/164,364

(22) Filed: Jun. 20, 2011

(65) Prior Publication Data

US 2012/0039385 A1    Feb. 16, 2012

Related U.S. Application Data

(60) Provisional application No. 61/356,404, filed on Jun. 18, 2010.

(51) Int. Cl.
H04N 19/34    (2014.01)
(52) U.S. Cl.
CPC ..................................... *H04N 19/34* (2014.11)
(58) Field of Classification Search
CPC ............................................... H04N 19/00442
USPC ................... 370/328; 375/240, 260, E7.027,
375/E7.139, E7.226, 240.03, 240.25;
714/752, 776, 758; 382/248; 341/107
See application file for complete search history.

(56) References Cited

U.S. PATENT DOCUMENTS

| 6,687,296 | B1 * | 2/2004 | Sato et al. ................. 375/240.12 |
| 6,738,424 | B1 * | 5/2004 | Allmen et al. ............ 375/240.08 |
| 7,305,031 | B2 * | 12/2007 | Ratakonda et al. ........... 375/240 |
| 8,286,050 | B2 * | 10/2012 | Murakami et al. ............ 714/752 |
| 2004/0098659 | A1 * | 5/2004 | Bjerke et al. ................... 714/776 |
| 2006/0200724 | A1 * | 9/2006 | Stankovic et al. ............ 714/758 |
| 2008/0246639 | A1 * | 10/2008 | Sakai et al. .................... 341/107 |
| 2010/0157901 | A1 * | 6/2010 | Sanderovitz et al. ......... 370/328 |
| 2010/0208801 | A1 * | 8/2010 | Yamasaki ................ 375/240.12 |
| 2011/0052087 | A1 * | 3/2011 | Mukherjee ..................... 382/248 |

OTHER PUBLICATIONS

M. Gastpar, B. Rimoldi, and M. Vetterli, "To code or not to code: Lossy source-channel communication revisited," IEEE Trans. Inform. Theory, vol. 49, No. 5, pp. 1147-1158, May 2003.

(Continued)

*Primary Examiner* — Christopher S Kelley
*Assistant Examiner* — Asmamaw G Tarko
(74) *Attorney, Agent, or Firm* — Meagher Emanuel Laks Goldberg & Liano, LLP

(57) ABSTRACT

A source channel encoder, source channel decoder and methods for implementing such devices are disclosed herein. The source channel encoder includes a linear transform encoder configured to generate a plurality of source components. A successive refinement quantizer is configured to generate a plurality of bit planes based on the source components. A systematic linear encoder configured to map the bit planes into channel-encoded symbols. The linear transform encoder may be configured to apply a Discrete Cosine Transform (DCT) or a Discrete Wavelet Transform (DWT). The linear transform encoder may be configured for differential encoding.

24 Claims, 9 Drawing Sheets

(56) References Cited

OTHER PUBLICATIONS

R. L. Urbanke and A. D. Wyner, "Packetizing for the erasure broadcast channel with an internet application," in Proc. Int. Conf. Combinatorlcs, Information Theory and Statistics, Portland, ME, 1997, p. 93.
O. Y. Bursalioglu, M. Fresia, G. Caire, and H. V. Poor, "Joint source-channel coding at the application layer," in Proc. IEEE Data Compression Conference, Snowbird, UT, 2009.
A. F. Dana, R. Gowaikar, R. Palanki, B. Hassibi, and M. Effros, "Capacity of wireless erasure netWorks," IEEE Trans. Inform. Theory, vol. 52, No. 3, pp. 789-804, Mar. 2006.
U. Mittal and N. Phamdo, "Hybrid digital-analog (IIDA) joint source-channel codes for broadcasting and robust communications," IEEE Trans. Inform. Theory, vol. 48, No. 5, pp. 1082-1102, May 2002.
O. Y. Bursalioglu, M. Fresia, G. Caire, and H. V. Poor, "Lossy joint source-channel coding using raptor codes," Int. Journal of Digital Multimedia Broadcasting, vol. Article ID 124685, 18 pages, 2008.
A. Shokrollahi, "Raptor codes," IEEE Trans. Inform. Theory, vol. 52, No. 6, pp. 2551-2567, Jun. 2006.
M. Fresia and G. Caire, "Combined error protection and compression with turbo codes for image transmission using a JPEG2000-like architecture," in Proc. IEEE Int. Conf. Image Proc., Atlanta, GA, 2006, pp. 821-824.
M. Fresia and G. Caire, "A practical approach to lossy joint source-channel coding," Jan. 2007, submitted to IEEE Trans. Inform. Theory.
H. Gish and J. N. Pierce, "Asymptotically efficient quantizing," IEEE Trans. Inform. Theory, vol. 14, No. 5, pp. 676-683, Sep. 1968.
J. Ziv, "On universal quantization," IEEE Trans. Inform. Theory, vol. 31, No. 3, pp. 344-347, May 1985.
M. Luby, T. Gasiba, T. Stockhammer, and M. Watson, "Reliable multimedia download delivery in cellular broadcast networks," IEEE Trans. Broadcasting, vol. 53, No. 1, pp. 235-246, Mar. 2007.
N. Shulman and M. Feder, "Static broadcasting," in Proc. IEEE Int. Symp. Inform. Theory, Sorrento, Italy, 2000.
L. S. Juhn and L. M. Tseng, "Harmonic broadcasting for video-on-demand service," IEEE Trans. Broadcasting, vol. 43, No. 3, pp. 268-271, Sep. 1997.
J. F. Paris, S. W. Carter, and D. D. E. Long, "Efficient broadcasting protocols for video on demand," in Proc. Symp. Modeling, Analysis and Simulation of Computer and Telecommunication Systems, Houston, TX, 1998, pp. 127-132.
W. H. R. Equitz and T. M Cover, "Successive refinement of information," IEEE Trans. Inform. Theory, vol. 37, No. 2, pp. 269-275, Mar. 1991.
K. A. Zeger and A. Gersho, "Zero redundancy channel coding in vector quantization," Electron. Lett., vol. 23, pp. 65-55, Jun. 1987.
K. A. Zeger and A. Gersho, "Pseudo-gray coding," IEEE Trans. Commun., vol. 38, pp. 2147-2158, Dec. 1990.
N. Farvardin, "A study of vector quantization for noisy channels," IEEE Trans. Inform. Theory, vol. 36, pp. 799-809, Jul. 1990.
N. Farvardin and V. Vaishampayan, "On the performance and complexity of channel-optimized vector quantizers," IEEE Trans. Inform. Theory, vol. 37, pp. 155-159, Jan. 1991.
O. Y. Bursalioglu, M. Fresia, G. Caire, and H. V. Poor, "Joint source-channel coding at the application layer for parallel Gaussian sources," submitted to IEEE Int. Symp. Inform. Theory, 2009.
B. Tang, A. Shen, A. Alwan, and G. Pottie, "A perceptually based embedded subband speech coder," IEEE Trans. on Speech and Audio Processing, vol. 5, No. 2, pp. 131-140, Mar. 1997.
M. Grangetto, B. Scanavino, and G. Olmo, "Joint source-channel iterative decoding of arithmetic codes," Proc. IEEE Int. Conf. on Commun., pp. 886-890, 2004.
M. Jeanne, J. Carlach, and P. Siohan, "Joint source-channel decoding of variable-length codes for convolutional codes and turbo codes," IEEE Trans. Commun., vol. 53, No. 1, p. 11, 2005.
L. Perros-Meilhac and C. Lamy, "Huffman tree based metric derivation for a low-complexity sequential soft VLC-decoding," in Proc. IEEE Int. Conf. on Commun., New York, NY, 2002, pp. 783-787.
M. Fresia and G. Caire, "A practical approach to lossy joint source channel coding," in Proc. Information Theory and Applications Workshop, University of California, San Diego, La Jolla, CA, 2007.

* cited by examiner

1) Transform encoding and generation of the source components 2) embedded quantization of each source component: generation of bit-planes 3) linear encoding of each bit-plane

|  | $S^{(1)}$ | $S^{(2)}$ | $S^{(3)}$ | $S^{(4)}$ |
|---|---|---|---|---|
| Sign Bitplane p = 1 | 1 | 1 | 1 | 2 |
| p = 2 | 1 | 1 | 3 | 3 |
|  | 1 | 2 | 3 |  |
|  | 2 | 2 |  |  |
|  | 2 | 3 |  |  |
|  | 2 | 3 |  |  |
|  | 3 | 3 |  |  |
|  | 3 |  |  |  |
| p = 9 | 3 |  |  |  |
|  |  |  |  |  |

$\pi_{1,1}=3 \quad \pi_{2,1}=2 \quad \pi_{3,1}=1 \quad \pi_{4,1}=0$ $\pi_{1,2}=6 \quad \pi_{2,2}=4 \quad \pi_{3,2}=1 \quad \pi_{4,2}=1$ $\pi_{1,3}=9 \quad \pi_{2,3}=7 \quad \pi_{3,3}=3 \quad \pi_{4,3}=2$

Figure 3

| 1 LL0 | 2 HL1 | 3 | 4 | 5 | 6 | 7 | 8 |
|---|---|---|---|---|---|---|---|
| 9 LH1 | 10 HH1 | 11 | 12 | | | | |

SYSTEM AND METHOD FOR LOSSY SOURCE-CHANNEL CODING AT THE APPLICATION LAYER

CROSS-REFERENCE TO PRIOR FILED APPLICATIONS

This application claims priority to earlier filed provisional application 61/416,986 filed on Jun. 18, 2010, which is incorporated herein in its entirety.

UNITED STATES GOVERNMENT RIGHTS

This invention was made with government support under CNS-06-25637 and NeTs-07-22073 awarded by U.S. National Science Foundation. The government has certain rights to this invention.

FIELD OF INVENTION

The invention relates to communications systems generally and more particularly relates to multicasting multimedia streaming systems.

BACKGROUND

Multimedia streaming over heterogeneous digital networks is one of the fastest growing applications both in terms of traffic demands and in terms of market potential. Systems can include a server, multicasting a multi-media source (audio/video) to a number of clients. Such systems lack a mechanism to provide real-time multicasting where the decoding delay is the same for all users; but each user reconstructs the source at a possibly different distortion, level, depending on its own channel capacity.

SUMMARY OF THE INVENTION

A source channel encoder, source channel decoder and methods for implementing such devices are disclosed herein. The source channel encoder includes a linear transform encoder configured to generate a plurality of source components. A successive refinement quantizer is configured to generate a plurality of bit planes based on the source components. A systematic linear encoder is configured to map the bit planes into channel-encoded symbols. The linear transform encoder may be configured to apply a Discrete Cosine Transform (DCT) or a Discrete Wavelet Transform (DWT). The linear transform encoder may be configured for differential encoding. The quantizer may be configured to generate a top (most significant) bit plane and a plurality of lower significance bit planes configured with decreasing resolution. The systematic linear encoder may include a Raptor encoder. The systematic linear encoder may be configured to directly map the bits planes into the channel-encoded symbols, e.g., without an intervening compression function. The systematic linear encoder may be configured to generate a minimum number of channel coded symbols based on a pre-determined distortion level. The systematic linear encoder may be configured to minimize a weighted sum of distortion levels based on a pre-determined number of channel coded symbols. The systematic linear encoder may be configured to minimize a maximum gap with respect to individual optimal distortion across all users based on a pre-determined number of channel coded symbols.

The source channel decoder includes a plurality of Belief Propagation (BP) decoders configured for successive decoding. Each BP decoder is associated with a single bit plane and is configured to generate a soft estimate of the bit plane based on an a-posteriori Log-Likelihood Ratio (LLR). A reconstruction engine is configured to produce an estimate of a source sample based on the a-posteriori LRRs generated by the BP decoders. The BP decoders may be configured to generate a hard estimate based on a Maximum A-posteriori Probability (MAP). The hard estimate may be passed to a successive BP decoder stage. The reconstruction engine may be configured to produce an estimate of the source sample based on minimum mean-square error (MMSE) criterion.

The method of encoding a source includes transforming the source using a linear transform and generating a plurality of source components. Successive refinement quantization is performed and a plurality of bit planes are generated based on the source components. Systematic linear encoding is performed to map the bit planes into channel-encoded symbols. The linear transform may be a Discrete Cosine Transform (DCT) or a Discrete Wavelet Transform (DWT). The linear transform may generate differential encoding. Top (most significant) bit plane and a plurality of lower significance bit planes configured with decreasing resolution may be generated. Raptor encoding may be performed. The bits planes may be directly mapped into the channel-encoded symbols. A minimum number of channel coded symbols may be generated based on a pre-determined distortion level. A weighted sum of distortion levels may be minimized based on a pre-determined number of channel coded symbols. A maximum gap may be minimized with respect to individual optimal distortion across all users based on a pre-determined number of channel coded symbols.

The decoding method includes successively decoding a plurality of bit planes and generating a soft estimate of each bit plane based on an a-posteriori Log-Likelihood Ratio (LLR). An estimate of a source sample is generated based on the a-posteriori LRRs. A hard estimate may be generated based on a Maximum A-posteriori Probability (MAP). The hard estimate may be passed to a successive decoder stage. An estimate of the source sample may be generated based on minimum mean-square error (MMSE) criterion.

BRIEF DESCRIPTION OF THE FIGURES

FIG. 3 is a diagram showing possible bit-plane allocation to layers;

FIG. 6 is a block diagram showing Discrete Wavelet Transform (DWT) subband decomposition and corresponding source component blocks;

DETAILED DESCRIPTION OF THE INVENTION

Figure 1:
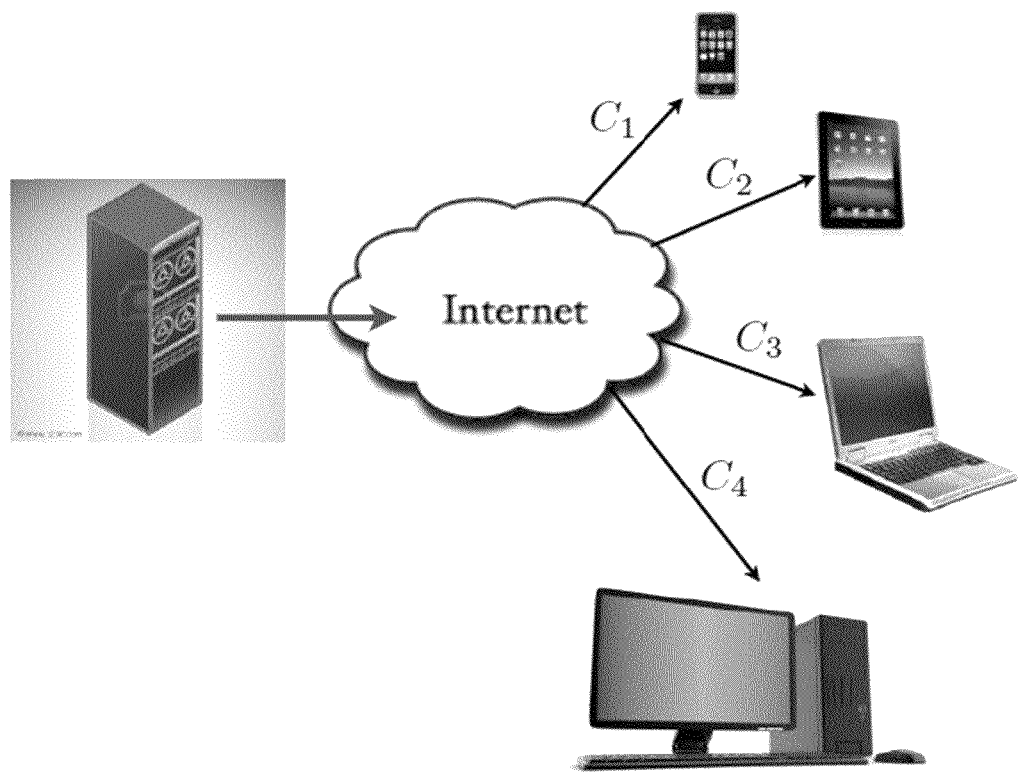
FIG. 1 is a block diagram showing multicasting of a multimedia source to many heterogeneous terminals through an heterogeneous network (Internet)

Multimedia streaming over heterogeneous digital networks is one of the fastest growing applications both in terms of traffic demands and in terms of market potential. Systems can include a server, multicasting a multi-media source (audio/video) to a number of clients. In one embodiment, a system can include support at the application layer. The underlying network (from the server to the clients) can be modeled as an erasure broadcast channel. Erasures represent packets that are lost in the network, for any reason such packet dropped due to congested nodes, or packet dropped because corrupted by unrecoverable channel errors. The underlying network may encompass any sort of heterogeneous wired or wireless network without departing from the scope of this disclosure. For example, the system may be formed using an Internet backbone, connected to a wireless router, or to a wireless cellular base station, or even with a DSL line to the end users.

A multimedia streaming application is generally an overlay system, that is, it operates at the application layer by using a fixed transport mechanism already built-in to the network, e.g., the User Datagram Protocol (UDP) currently used as an alternative to TCP on top of the ubiquitous Internet Protocol (IP). A conventional approach consists of establishing individual streaming sessions from the server to each user. This may be very inefficient when many users wish to receive the same content (e.g., in mobile television or video on demand applications). As disclosed herein, it is possible to use an efficient scalable Joint Source-Channel Coding (JSCC) for the transmission of a source over an Erasure Broadcast Channel. This approach is referred to as JSCC at the application layer since the underlying physical channels is disregarded, in contrast to most common JSCC approaches.

A system may be formed as follows: at the encoder (server), a natural multimedia source is encoded using standard transform coding, with possible differential encoding in order to reduce the redundancy in the time domain. The subbands of the transform/differential encoder are quantized by multiresolution (embedded) quantization, thus producing redundant bit-streams for successive refinement. Instead of using conventional entropy coding (e.g., arithmetic coding) in order to remove the redundancy in the bit-streams, the redundant bits are directly mapped onto channel-encoded symbols, using a family of linear encoders. The linear encoding of the bit-streams is performed independently, for each bit-stream, and may be implemented by any good family of systematic linear codes with tunable rate (for example, this can be obtained using a rateless code, a library of punctured turbo codes, a library of LDPC codes etc. . . . ). The allocation of the source layers to different users is optimized according to an optimal resource allocation algorithm that can incorporate suitable distortion criteria. At each decoder (client), the source layers are decoded successively, up to the layer allocated to the given user. Decoding may be performed using low-complexity Belief Propagation iterative decoding. The source may be reconstructed according to the minimum mean-square error (MMSE) criterion using softbit reconstruction. The system may be implemented using rateless codes and in particular Raptor Codes, since they offer a simple way to generate a very flexible adaptive rate encoding.

This disclosure encompasses systems used in real-time multicasting where the decoding delay is the same for all users, but each user reconstructs the source at a possibly different distortion level, depending on its own channel capacity. The embodiments disclosed herein can be naturally applied to static broadcasting (e.g., video on demand applications), if used jointly with well-known protocols such as harmonic broadcasting. Simulation results may be used to assess the effectiveness the proposed coding scheme showing that it can achieve end-to-end distortion performance very close to the theoretical limits with finite block length and low encoding/decoding complexity.

Encoding

FIG. 1 is a block diagram showing multicasting of a multimedia source to many heterogeneous terminals through an heterogeneous network (Internet), modeled as an erasure broadcast channel with packet losses with individual capacities $C_1 \leq C_2 \leq \ldots \leq C_L$. A server sends a stream of packets to multiple users. In this example it is assumed that users are partitioned into L classes, each of which is characterized by a packet loss probability $\epsilon_l$, and therefore by a channel capacity $C_l = 1 - \epsilon_l$ (capacity is measured in information bits per binary transmitted symbol). The techniques disclosed herein allow for transmission of a single encoded stream, such that each user class can recover the source at a given desired level of distortion, $D_l$.

A system may be formed with the following building blocks: an encoder (at the server), and decoders (at the clients). A description of the encoding and decoding processes is set forth below. For the sake of simplicity, the specific example of sending a digital picture is used. The disclosed techniques may be directly applied to video, with frame-by-frame encoding. As detailed below, the same encoding principle can be combined with standard differential encoding for video, in order to encode the residual frames after the elimination of the time-redundancy by motion compensation (as in the MPEG-2, MPEG-4 and H.264 standards). Also, the disclosed techniques may be combined with so-called harmonic broadcasting (also known as skyscraper architecture), in order to implement video on demand applications with low waiting time.

Figure 2A:
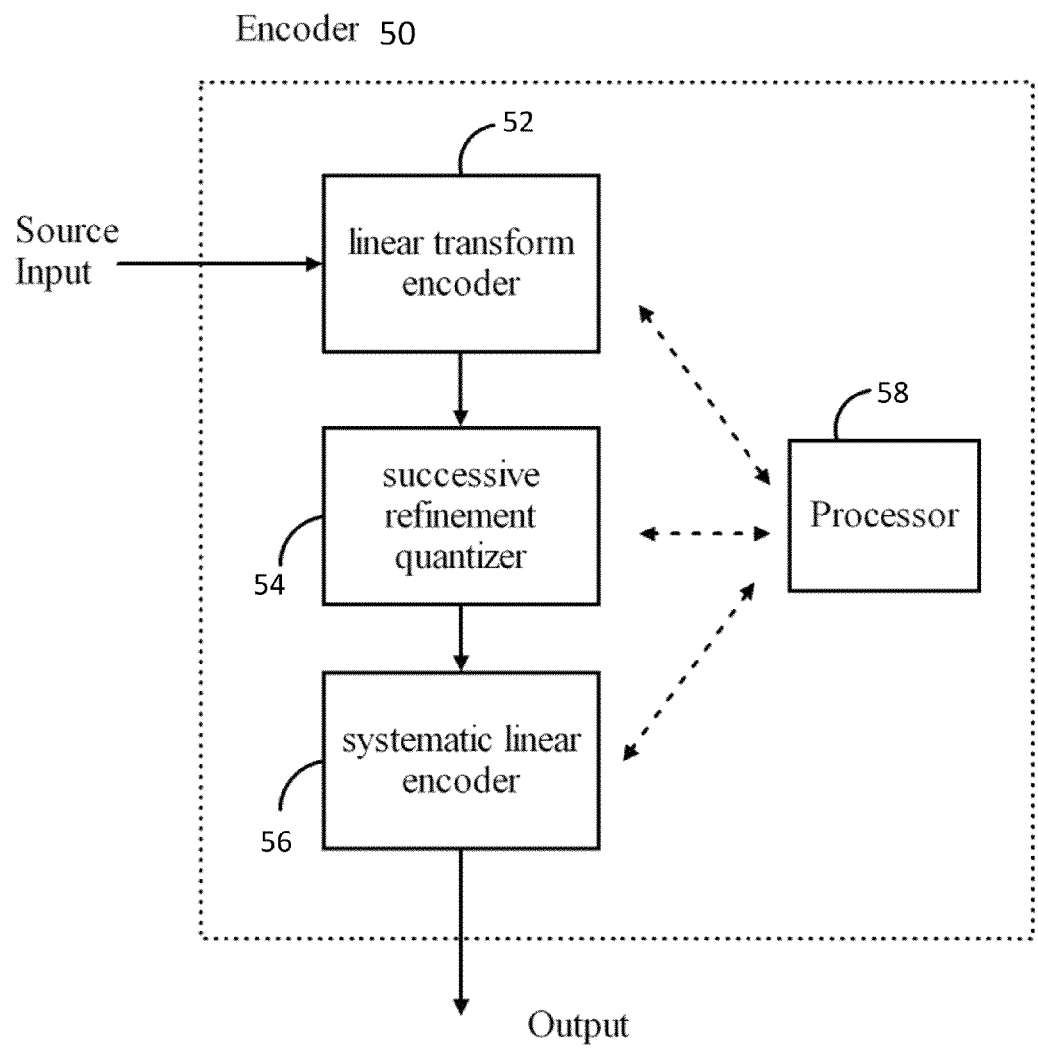
FIG. 2a is a block of an encoder.
Figure 2B:
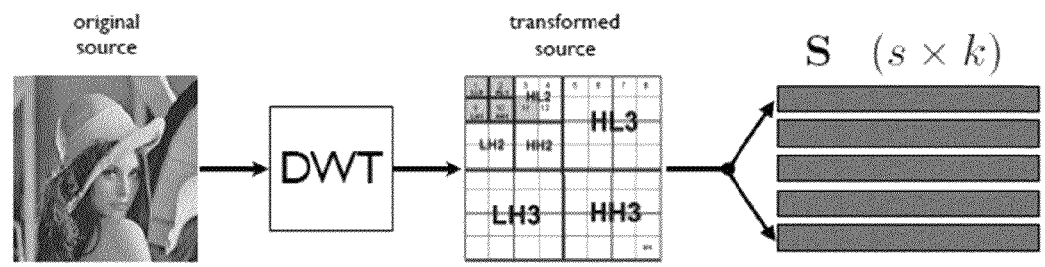
FIG. 2b is a block diagram showing encoder functionality.
Figure 2B:
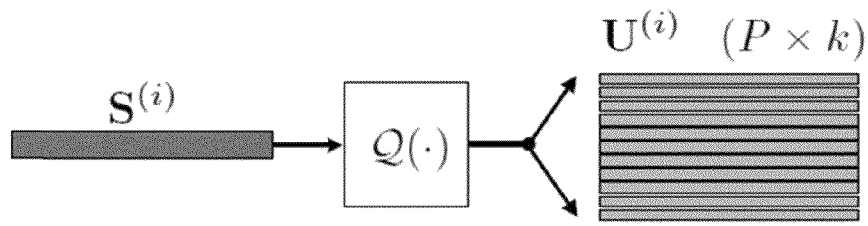
Figure 2B:
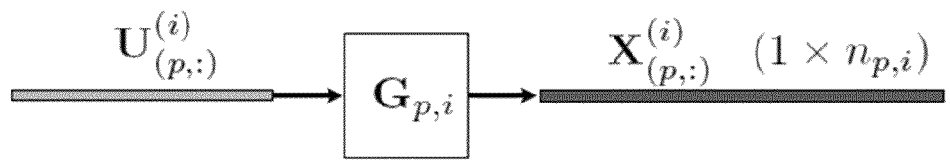

FIG. 2a is a block diagram of a source channel encoder 50 implemented in accordance with this disclosure. The encoder 50 includes a linear transform encoder 52 configured process a source input and generate a plurality of source components. A successive refinement quantizer 54 is configured to generate a plurality of bit planes based on the source components. A systematic linear encoder 46 is configured to map the bit planes into channel-encoded symbols for output. The encoder may also include one or more processors 58. The encoder 50 can be implemented in hardware, software or a combination of both as is well known in the art with respect to such devices. It should also be understood that encoder 50 may be embedded within other devices such as a server. FIG. 2b is a block diagram showing encoder functionality. As discussed above, the encoder building blocks include:

1) Transform encoding, e.g., differential encoding in the case of video, followed by a linear transform of the resulting frames, e.g., Discrete Cosine Transform (DCT), Discrete Wavelet Transform (DWT). This example is directed to the encoding of a single image (single frame) and use of a DWT generally in accordance with the JPEG-2000 image compression standard. It should be understood that the techniques disclosed herein may be used with any suitable linear transform. In this example, S is an s×k array of transform coefficients. Each row of S, denoted by $S^{(i)}$, is referred to as a source component (encoded separately).

2) Quantization—each source component $S^{(i)}$ is quantized by using a family of embedded nonuniform scalar quantizers. In this example, the quantization function is denoted as Q: $\mathbb{R} \to \{0,1\}^P$, where $2^P$ is the number of quantization regions for the highest level of refinement. $D_Q(p)$ denotes the distortion for the unit-variance source, with $0 \leq p \leq P$ quantization bits, it follows that the distortion for the i-th source component is given by $D_{Q,i}(p) = \sigma_i^2 D_Q(p)$, where $\sigma_i^2$ denotes the variance of $S^{(i)}$. The quantizer output for source $S^{(i)}$ is a binary array $U^{(i)}$ of dimension P×k, such that each column $u_j^{(i)}$ contains the binary representation of the quantization of the corresponding source symbol $s_j^{(i)}$. The rows of $U^{(i)}$, denoted by $U_{(\rho,:)}^{(i)}$ for $p=1, \ldots, P$, are referred to as bit-planes. Given the multiresolution embedded nature of the quantizer, the source is going to be reconstructed with distortion $\sigma_i^2 D_Q(p)$, provided that the top (most significant) p bit-planes are used by the decoder, while disregarding completely the bottom (least significant) P-p bit-planes. The number of bit-planes that must be used for reconstruction by decoders in each user class l is indicated by $\pi_{i,l}$. The determination of the values $\pi_{i,l}$ for all source components i and user class l defines a bit-allocation. The determination of the optimal bit-allocation for a given source frame S and users' capacities $C_1 \leq \ldots \leq C_L$ depends on the desired objective function to be optimized. This forms the so-called resource allocation problem, is discussed below.

3) Linear encoding of the bit-planes into channel symbols—FIG. 3 is a diagram showing possible bit-plane allocation to layers. For the given $\pi_1,: \pi_2,:,\pi_3,:, \pi_4,:$ values, corresponding layer numbers are indicated for each bit plane. Let $\pi_{i,l}$ denote the number of bit-planes of source component i that must be decoded by user l. Each bit-plane is encoded separately and the coding rate is allocated such that each user l can successively recover the bit-planes $1 \leq p \leq \pi_{i,l}$ for each $i=1, \ldots, s$. The bit-planes $U_{(p,:)}^{(i)}$, for $\pi_{i,l-1} < p \leq \pi_{i,l}$, are mapped into codewords $X_{(p,:)}^{(i)} = U_{(p,:)}^{(i)} G_{p,i}$, where $G_{p,i}$ denotes the $k \times n_{p,i}$ generator matrix of a suitable linear code. This approach uses a family of linear codes with block length and rate flexibility. In brief, we need an encoding $G_{p,i}$ for dimension $k \times n_{p,i}$ with any k and ratio $0 \leq k/n_{p,i} \leq 1$. In order to accomplish this great block length and rate flexibility, a systematic Raptor Encoder may be used. This can be seen as a method for constructing such family of encoding matrices, such that each resulting linear code is an efficient code for the binary erasure channel. For completeness, Appendix A summarizes the main features of such a linear encoder. The overall channel-encoded block X is formed by the concatenation of all codewords $$\{X_{(p,:)}^{(i)}\}$$

for $p=1, \ldots, P$ and $i=1, \ldots, s$, where it is understood that if some bit-plane is encoded with zero bits, the corresponding codeword is not present. The total source-channel encoder output length is given by:

$$n = \sum_{i=1}^{s} \sum_{l=1}^{L} \sum_{p=\pi_{i,l-1}+1}^{\pi_{i,l}} n_{p,i}, \quad (1)$$

where, by definition, $\pi_{i,0}=0$. Due to the degraded nature of the Erasure Broadcast Channel, the user l is able to decode all blocks (p,i) for $1 \leq p \leq \pi_{i,l}$ and $i=1, \ldots, s$. The bit-planes can be decoded in sequence, using the multi-stage decoder described below. The overall number of channel encoded binary symbols per source symbol is given by n/(sk).

Decoding

The following disclosure focuses on the decoder of user class l. For each source component, the decoder wishes to reconstruct an approximation, in the MMSE sense, of the source block $S^{(i)}$. In order to do so, it decodes the bit-planes 1, 2, ..., $\pi_{i,l}$ for all $i=1, \ldots, s$. The bit-planes of each source component can be decoded separately from the other source components. We focus on the decoder for the i-th source component. The same technique may be applied to all source components $i=1, \ldots, s$ and for all user classes $l=1, \ldots, L$.

Figure 4:
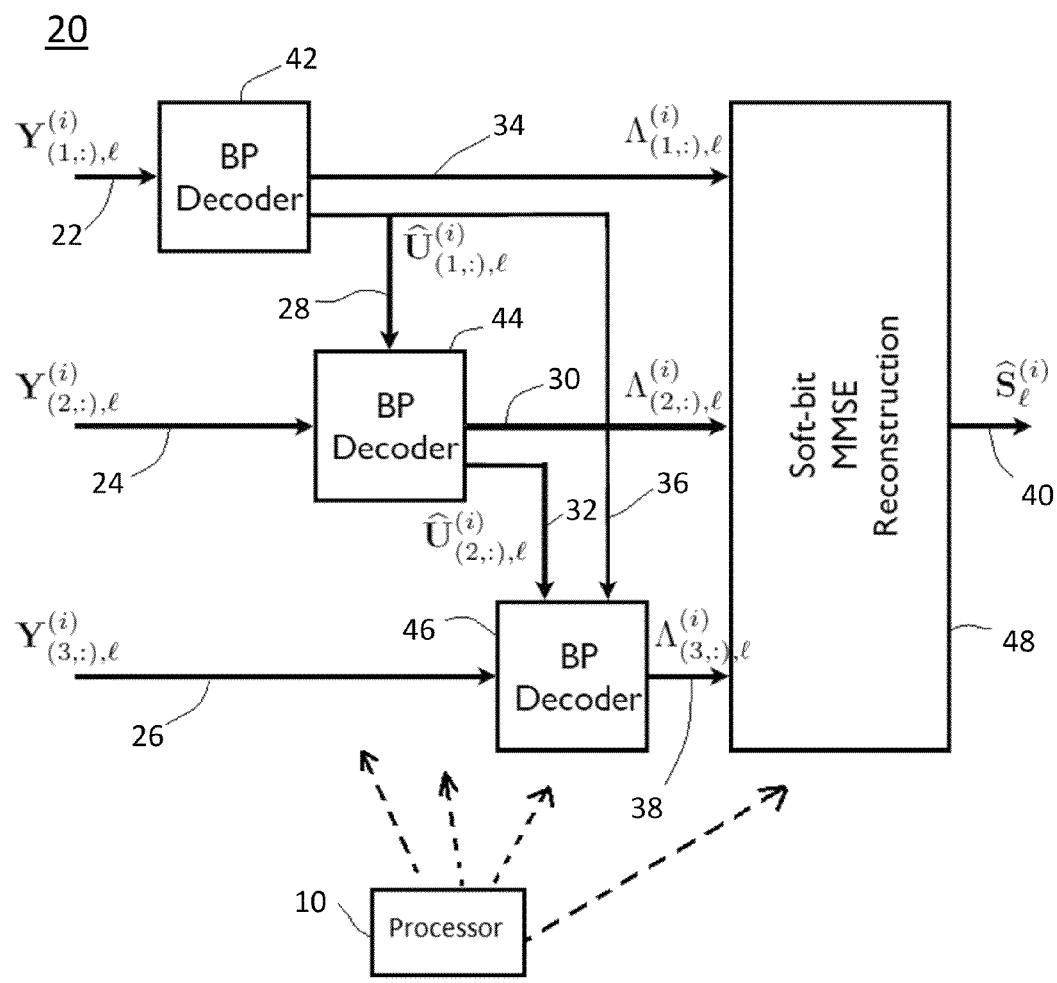
FIG. 4 is a block diagram of an encoder, for the case of $\pi_{i,j}=3$ stages.

FIG. 4 is a block diagram of a source channel decoder 20, for the case of $\pi_{i,l}=3$ stages. The decoder 20 includes a plurality of Belief Propagation (BP) decoders 42, 44, 46 configured for successive decoding. Each BP decoder 42, 44, 46 is associated with a single bit plane and is configured to generate a soft estimate of the bit plane based on an a-posteriori Log-Likelihood Ratio (LLR). A reconstruction engine 48 is configured to produce an estimate of a source sample based on the a-posteriori LRRs generated by the BP decoders.

The input lines 22, 24 and 26 indicate the flow of the received signal (from the l-th channel output), lines 28, 30 and 32 indicate the flow of the hard decisions, propagated through the successive decoding stages, and lines 34, 36, 38 and 40 indicate the flow of the decoders soft-output and reconstructed estimated source block. As discussed above, the decoder 20 may also include one or more processors 10. The decoder 20 can be implemented in hardware, software or a combination of both as is well known in the art with respect to such devices. It should also be understood that decoder 20 may be embedded within other devices such as a client device, e.g., a computing device, network appliance, mobile phone, television or other multimedia device. The decoder functionality is carried out by the following building blocks:

Successive Decoding: In order to decode the (p, i)-th bit-plane, the decoder must make use of the conditional a-priori probability $\mathbb{P}(U_{(p,:)}^{(i)} | U_{(1,:)}^{(i)}, \ldots, U_{(p-1,:)}^{(i)})$ of the p-th bit-plane, conditioned on the previous bit-planes 1, ..., p−1. The conditional probability mass function $\mathbb{P}(U_{(p,:)}^{(i)} | U_{(1,:)}^{(i)}, \ldots, U_{(p-1,:)}^{(i)})$ is encoded and sent as a header information directly to the decoders, and therefore it is known to the decoders.

The bit-planes may be decoded in sequence (successive decoding). Bit-plane $(U_{(1,:)}^{(i)})$ may be decoded first, using the a-priori probability mass function $\mathbb{P}(U_{(1,:)}^{(i)})$, known from the header information. This is decoder stage 1. Then, bit-plane $(U_{(2,:)}^{(i)})$ may be decoded using the probability mass function $\mathbb{P}(U_{(2,:)}^{(i)} | \hat{U}_{(1,:)}^{(i)})$, where $\hat{U}_{(2,:)}^{(i)}$ denotes the decoded bit-plane decision made at stage 1. In decoder stage 2, bit-plane $(U_{(3,:)}^{(i)})$ be decoded using the probability mass function $\mathbb{P}(U_{(3,:)}^{(i)} | \hat{U}_{(1,:)}^{(i)}, \hat{U}_{(2,:)}^{(i)})$, where $\hat{U}_{(2,:)}^{(i)}$ the decoded bit-plane decision made at stage 2. In decoder stage 3, the successive decoding process continues until the required bit-plane index $\pi_{i,l}$.

Iterative Message Passing Decoding with soft-output, for each stage: Let $Y_{(p,:),l}^{(i)}$ denote the channel output received by user l corresponding to the transmission of $X_{(p,:)}^{(i)}$. The optimal decoding rule at each stage p of the multi-stage successive decoder operates according to the Maximum A-posteriori Probability (MAP) principle, according to the rule $$\hat{U}_{(p,:),l}^{(i)} = \arg\max_{u \in \{0,1\}^k} \mathbb{P}(uG_{p,i} | Y_{(p,:),l}^{(i)}, \hat{U}_{(1,:),l}^{(i)} \ldots \hat{U}_{(p-1,:),l}^{(i)}). \quad (2)$$

For sparse-graph codes, the MAP rule above would be computationally too complex. Instead, a low complexity iterative Belief Propagation algorithm (BP) may be used at each stage of the multi-stage decoder. Raptor Codes may be used for the linear encoding of the bit-planes. The BP decoder, at each stage p, produces a sequence of Extrinsic Log-Likelihood Ratios (Ext-LLRs) (see Appendix A) denoted by $\{\xi_{(p,j),l}^{(i)} : j=1, \ldots, k\}$. The Ext-LLRs are combined with the source a-priori LLRs, given by $\lambda_{p,j}^{(i)}(u_1, \ldots, u_{p-1})$, as defined in Appendix B, in order to obtain the a-posteriori LLRs, given by $\Lambda_{(p,j),l}^{(i)}(u_1, \ldots, u_{p-1}) = \xi_{(p,j),l}^{(i)} + \lambda_{p,j}^{(i)}(u_l, \ldots, u_{p-1})$. Then, for each quantization bit (p, j) a hard-decision is made according to the MAP symbol-by-symbol rule:

$$\hat{U}_{(p,j),l}^{(i)} = \begin{cases} 0 & \text{if } \Lambda_{(p,j),l}^{(i)}(\hat{U}_{(p-1,j),l}^{(i)} \ldots \hat{U}_{(p-1,j),l}^{(i)}) \geq 0 \\ 1 & \text{otherwise.} \end{cases} \quad (3)$$

These hard decisions are passed to the next stage p+1.

Soft-bit MMSE reconstruction: the collection of all a-posteriori LLRs $\{\Lambda_{(p,j),l}^{(i)}\}$ for all p, j and i are used for the source reconstruction according to the minimum MSE (MMSE) criterion, according to the rule (see Appendix B):

$$\hat{S}_{j,l}^{(i)} = \sum_{u_1=0}^{1} \ldots \sum_{u_{\pi_{i,l}}=0}^{1} c^{(i)}(u_1 \ldots u_{p_{i,l}}) \prod_{p=1}^{\pi} \frac{e^{-u_p \Lambda_{(p,j),l}^{(i)}(u_1 \ldots u_{p-1})}}{1 + e^{\Lambda_{(p,j),l}^{(i)}(u_1 \ldots u_{p-1})}}. \quad (4)$$

where $c^{(i)}(u_1, \ldots, u_{\pi_{i,j}})$ denotes the centroid of the quantization bin indexed by $(u_1, \ldots, u_{\pi_{i,j}})$ for the i-th source component embedded quantizer, at the $u_{\pi_{i,j}}$-th resolution level. The rule above can be interpreted as the weighted sum of all centroids of the $u_{\pi_{i,j}}$-th resolution level of the quantizer, with weights given by the posterior probabilities of the quantization bits decoded by the multi-stage BP decoder.

Resource Allocation

The Binary Erasure Broadcast Channel (BEBC) with L receiver classes has input alphabet $\{0,1\}$, output alphabet $\{0,1,e\}$ ("e" denoting erasure), and is defined by L Binary-Erasure Channels (BECs) with erasure probability $\epsilon_1 \leq \ldots \leq \epsilon_L$ and capacity $C_l = 1 - \epsilon_l$. For simplicity, each class is referred to as a "user" since, in a multicast scenario, all users belonging to the same class are statistically equivalent and achieve the same performance. The capacity region of the BEBC is given by:

$$C = \left\{ (R_1, \ldots, R_L) : R_l \geq 0 \cdot \sum_{l=1}^{L} \frac{R_l}{C_l} \leq 1, l \in \{1, \ldots, L\} \right\}. \quad (5)$$

This region is achieved by time-sharing of the coding strategies that achieve the vertices of the region's dominant face, corresponding to the individual user capacities. A "broadcast code" for the BEBC is obtained by multiplexing (time-sharing) single-user codewords for the different users. The BEBC belongs to the class of stochastically degraded broadcast channels. Whatever can be decoded by user l, can also be decoded by all users j>l.

An (s×k)-to-n source-channel multicast code for the BEBC is formed by an encoding function $f: \mathbb{R}^{s \times k} \to \{0,1\}^n$ such that S is mapped into the channel input codeword $X=f(S)$, and by L decoding functions $g_l: \{0,1,e\}^n \to \mathbb{R}^{s \times k}$, for $l=1, \ldots, L$, such that at each l-th user receiver, the received channel output $Y_l$ is mapped into the reconstructed source block $\hat{S}_l = g_l(Y_l)$.

The details of the encoding function $f(\cdot)$ and decoding functions $g_l(\cdot)$ for the proposed scheme are detailed above. The following disclosure is directed to optimizing system parameters in order to achieve optimal distortion according to certain specific criteria. A Weighted MSE (WMSE) distortion measure may be defined as follows. Let the MSE distortion for the l-th decoder and the i-th source component be given by $$D_{i,l} = \frac{1}{k}\mathbb{E}\left(\left\|S^{(i)} - \hat{S}_l^{(i)}\right\|^2\right).$$

Then, the WMSE distortion at the l-th decoder is defined as:

$$D_l = \frac{1}{s}\sum_{i=1}^{s} \upsilon_i D_{i,l}, \quad (6)$$

where $\{\upsilon_i \geq 0: i=1, \ldots, s\}$, are weights that depend on the specific application. Let $r_i(\cdot)$ denote the R-D function of the i-th source component with respect to the MSE distortion. Then the R-D function of S is given by:

$$\mathcal{R}(D) = \min \frac{1}{s}\sum_{i=1}^{s} r_i(d_i), \text{ subject to } \frac{1}{s}\sum_{i=1}^{s} \upsilon_i d_i = D. \quad (7)$$

Where $\{d_i: i=1, \ldots, s\}$ are dummy optimization variables, corresponding to the individual MSE distortions of the i-th source components.

The functions $\{r_i(d): i=1, \ldots, s\}$ depend the specific scalar embedded quantizer $Q(\cdot)$ as disclosed above. These functions are convex and non-increasing, and identically zero for $$d \geq \frac{1}{k}\mathbb{E}\left[\|S^{(i)}\|^2\right].$$

Each source component may be encoded individually, into L successive refinement codewords of appropriate rates. The s codewords at successive refinement level l form the l-th source layer. Layers may be channel-encoded at a rate as close as possible to the capacity $C_l$, such that all users j≥l can successfully decode, but no user j<–l can. Each user l reconstructs the source using all layers from 1 to l.

Assume that b=n/(ks) is the number of channel-coded bit per source sample (referred to as "pixel" in the following). The ratio b measures how many channel-encoded bits must be sent, on average, for each source pixel, and it is indicated in bit-per-pixel (bpp). Let $R'_{i,l}$, for $i=1, \ldots, s$ and $l=1, \ldots, L$, denote the source coding rate of source component i at successive refinement level l. This corresponds to $kR'_{i,l}$ information bits. Let $R_l$ denote the channel coding rate of layer l. Then, we have $$\frac{1}{s}\sum_{i=1}^{s} R'_{i,l} = bR_l,$$

where the channel coding rate L-tuple $(R_1, \ldots, R_L)$ must be in the BEBC capacity region. The distortion for user l is given by:

$$D_l = \mathcal{R}^{-1}\left(\frac{1}{s}\sum_{j=1}^{l}\sum_{i=1}^{s} R'_{i,l}\right) = \mathcal{R}^{-1}\left(b\sum_{j=1}^{l} R_j\right). \quad (8)$$

As disclosed in the Encoding section, sparse-graph codes (in particular, Raptor Codes) may be used to perform the linear encoding of the bit-plane bits into channel codewords.

A common feature of these codes is that they exhibit a post-decoding erasure rate characterized by a very sharp "waterfall" behavior: if $R<C/(1+\theta)$, for some code-dependent factor $\theta>0$, then the residual erasure probability is extremely small (in fact, it vanishes in the limit of infinite block length). Otherwise, for $R>C/(1+\theta)$, the residual erasure probability is $\approx \epsilon = 1-C$, i.e., the code is ineffective to recover the channel erasures. The code operates "below threshold" if $R<C/(1+\theta)$. Otherwise, the code operates "above threshold". Since Raptor codes may be used, $\theta$ is referred to as the coding overhead.

This layered approach is defined by the family of successive refinement source codes described by their R-D functions $\{r_i(d): i=1, \ldots, s\}$, and by a family of channel codes characterized by their overhead parameters $\{\theta_l: l=1, \ldots, L\}$. Three system optimization problems, for three different performance criteria are set forth below:

Minimum Bandwidth (MB): For given user target distortions $\Delta_1 \geq \ldots \geq \Delta_L$, we wish to minimize the number of coded bpp b. Using the equations disclosed above, we have the following problem:

$$\text{Minimize } b \quad (9)$$

$$\text{subject to } b\sum_{j=1}^{l} R_j \geq R(\Delta_l), \forall l$$

$$\sum_{l=1}^{L} \frac{R_l(1+\theta_l)}{C_l} \leq 1, R_l \geq 0 \forall l.$$

This problem is immediately solved as follows: letting $R(\Delta_0)=0$, we find that a necessary condition for optimality is that the inequyities $bR_l \geq R(\Delta_l)-R(\Delta_{l-1})$ holds with equality for all $l=1, \ldots, L$. Replacing these equalities into the capacity region constraint, we obtain the solution:

$$b^* = \sum_{l=1}^{L} \frac{(R(\Delta_l) - R(\Delta_{l-1}))(1+\theta_l)}{C_l}. \quad (10)$$

Min Weighted Total Distortion (MWTD): For given b and non-negative weights $\{w_l\}$, we wish to minimize $\sum_{l=1}^{L} w_l D_l$. The problem can be formulated as:

$$\text{minimize } \sum_{l=1}^{L} w_l \left(\frac{1}{s}\sum_{i=1}^{s} v_i D_{i,l}\right) \quad (11)$$

$$\text{subject to } \sum_{l=1}^{L} \frac{R_l(1+\theta_l)}{C_l} \leq 1, R_l \geq 0 \forall l,$$

$$R\left(\frac{1}{s}\sum_{i=1}^{s} v_i D_{i,l}\right) \leq b\sum_{j=1}^{l} R_j, \forall l, \sigma_i^2 \geq D_{i,1} \geq \ldots \geq D_{i,L} \geq 0, \forall i,$$

where the optimization variables are the partial source-layer distortions $\{D_{i,l}\}$ and the channel coding rates $\{R_l\}$, and where $\sigma_i^2$ denotes the variance (per symbol) of the i-th source component $S^{(i)}$.

Min-Max Distortion Penalty (MMDP): For given b, we wish to minimize $\max_{l=1,\ldots,L} D_l/D_l^{opt}$, where $D_l^{opt}=R^{-1}(bC_l)$ is the R-D bound for user l as if it was the only user in the system (single-user bound) and ideal (capacity achieving) channel coding was possible. The problem can be formulated as:

$$\text{Minimize } \alpha \quad (12)$$

$$\text{subject to } \sum_{l=1}^{L} \frac{R_l(1+\theta_l)}{C_l} \leq 1,$$

$$R_l \geq 0 \forall l,$$

$$R\left(\frac{1}{s}\sum_{i=1}^{s} v_i D_{i,l}\right) \leq b\sum_{j=1}^{l} R_j, \forall l$$

$$\frac{1}{s}\sum_{i=1}^{s} v_i D_{i,l} \leq \alpha D_l^{opt}, \forall l, \sigma_i^2 \geq D_{i,1} \geq \ldots \geq D_{i,L} \geq 0, \forall i,$$

where the optimization is with respect to a, $D_{i,l}$ and $\{R_l\}$. The following sections particularize the above problems to some significant cases.

In order to apply the general optimization problems to this setting, we need to define the R-D functions $r_i(d)$. Let $U^{(i)}=Q(S^{(i)})$ denote the sequence of binary quantization indices, formatted as an $P \times k$ binary array. The p-th row of $U^{(i)}$, denoted by $U_{(p,:)}^{(i)}$, is referred to as the p-th "bit-plane". Without loss of generality, we let $U_{(1,:)}^{(i)}$ denote the sign bit-plane, and $U_{(2,:)}^{(i)}, \ldots, U_{(p,:)}^{(i)}$ denote the magnitude bit-planes with decreasing order of significance. The quantizer output $U^{(i)}$ can be considered as a discrete memoryless source, with entropy rate $$H^{(i)} = \frac{1}{k}H(U^{(i)})$$

(in bits/source symbol). Using the chain rule of entropy, this can be decomposed as $H^{(i)}=\sum_{p=1}^{P} H_p^{(i)}$, where the conditional entropy rates of the bit-planes are denoted by:

$$H_p^{(i)} = \frac{1}{k}H(U_{(p,:)}^{(i)} | U_{(1,:)}^{(i)} \ldots U_{(p-1,:)}^{(i)}), p = 1 \ldots P. \quad (13)$$

Figure 5:
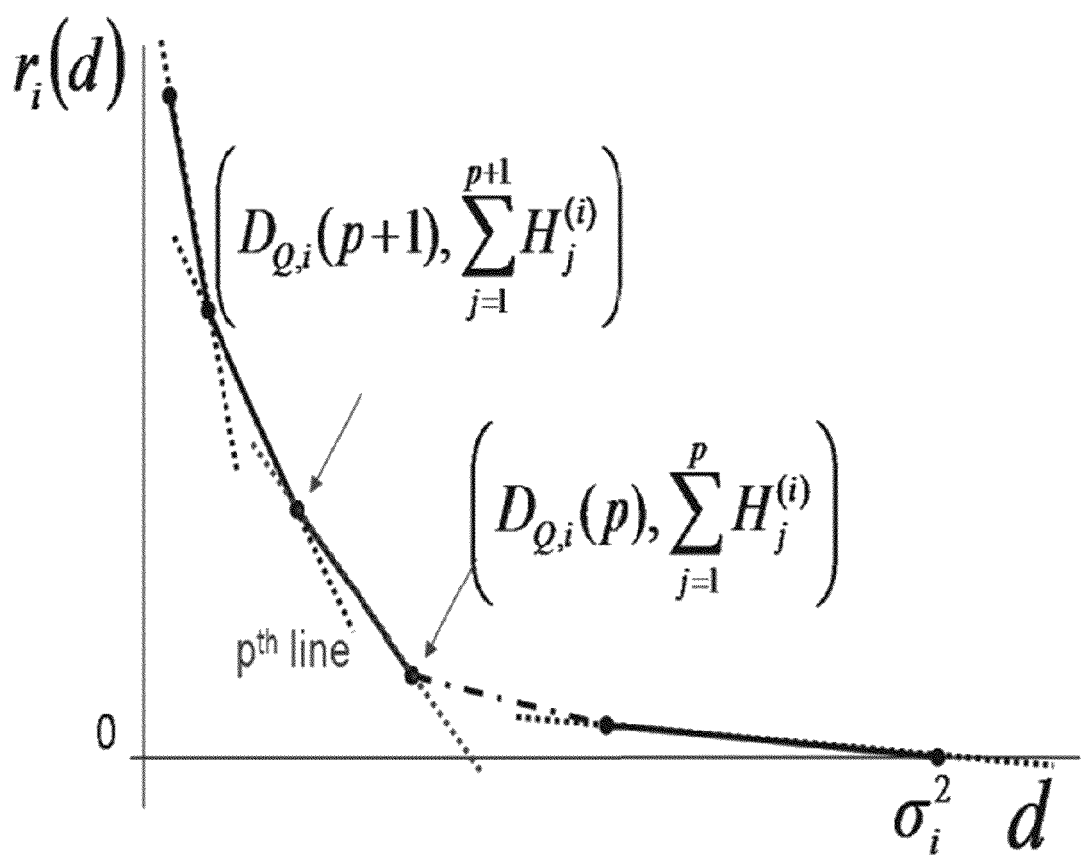
FIG. 5 shows, qualitatively, the typical shape of the functions $r_i(d)$.

Then, the set of R-D points achievable by the embedded scalar quantizer using $0, 1, \ldots, P$ quantization bits is given by:

$$\left(\sum_{j=1}^{p} H_j^{(i)}, D_{Q,i}(p)\right), p = 0, \ldots, P, \quad (14)$$

where, by definition, $D_{Q,i}(0)=\sigma_i^2$. Using time-sharing, any point in the convex hull of the above achievable points is also achievable. Finally, the operational R-D curve $r_i(d)$ of the scalar quantizer is given by the lower convex envelope of the convex hull of the points in the equation above. It is easy to see that since P is finite, then $r_i(d)$ is a piecewise linear function. Therefore, the resulting function $r_i(d)$ is convex and decreasing on the domain, $D_{Q,i}(P) \leq d \leq \sigma_i^2$. FIG. 5 shows, qualitatively, the typical shape of the functions $r_i(d)$, a piecewise linear operational R-D function for the i-th source corresponding to a set of discrete R-D points.

As seen from FIG. 5, it is possible to represent $r_i(d)$ as the pointwise maximum of a set of lines joining consecutive points in the set in the equation above. Hence, we can write:

$$r_i(d) = \max_{p=1,\ldots,P} \{a_{i,p}d + b_{i,p}\}, \tag{15}$$

where the coefficients $a_{i,p}$ and $b_{i,p}$ are obtained from the prior equation (details are omitted for the sake of brevity). It is also possible to obtain the operational R-D function of the parallel source as the solution of a linear program. Introducing the auxiliary variables we have:

$$R(D) = \min_{\{d_i\},\{\gamma_i\}} \frac{1}{s}\sum_{i=1}^{s} \gamma_i \tag{16}$$

$$\text{subject to } \frac{1}{s}\sum_{i=1}^{s} v_i d_i \le D, \; 0 \le \gamma_i \le \sum_{j=1}^{P} H_j^{(i)} \forall \; i$$

$$D_{Q,i}(P) \le d_i \le \sigma_i^2 \forall \; i, \; \gamma_i \ge a_{i,p}d_i + b_{i,p} \forall \; i, \; p.$$

The MWTD and MMDP problems defined before can be modified to include the case of a given entropycoded embedded quantization scheme, by using the above formulas directly into the optimization problems. For example, the MMDP problem can be written as follows:

$$\text{Minimize } \alpha \tag{17}$$

$$\text{subject to } \sum_{l=1}^{L} \frac{R_l(1+\theta_l)}{C_l} \le 1, \; R_l \ge 0 \forall \; l,$$

$$\frac{1}{s}\sum_{i=1}^{s}\gamma_{i,l} \le b\sum_{j=1}^{l} R_j, \forall \; l, \; \sigma_i^2 \ge D_{i,1} \ge \ldots \ge D_{i,L} \ge D_{Q,i}(P), \forall \; i,$$

$$\gamma_{i,l} \ge a_{i,p}D_{i,l} + b_{i,p}, \; \forall \; i,l, \; p.$$

$$0 \le \gamma_{i,l} \le \sum_{j=1}^{P} H_j^{(i)}.$$

$$\forall \; i,l. \; \frac{1}{s}\sum_{i=1}^{s} v_i D_{i,l} \le aD_l^{opt}, \forall \; l.$$

This problem formulation applies to any family of successive refinement source codes that can operate at a finite set of possible R-D points.

In general, the coding rate overhead at each bit-plane may be allocated such that each stage of the multi-stage BP decoder works with enough reliability in order to: 1) provide reliable hard decisions (3) in order to avoid error propagation in the multi-stage decoder; 2) achieve output distortion close enough to the designed quantization distortion. For each p-th bit plane of the i-th source component, the overhead $\theta_{p,i,l}$ can be optimized numerically, for the given family of codes. The values $\theta_{(p,i,l)}$ depend, in general, on the bit-plane entropy $H_p^{(i)}$, on the source statistics and on the l-th user channel capacity, as well as on the coding block length k. Fortunately, for the family of Raptor codes used herein, we have observed that the dependence of the factors $\theta_{p,i,l}$ on the source statistics and on the channel capacity is very weak. In fact, for a given block length k, we can choose a set of values $\{\theta_p: p=1, \ldots, P\}$ that is uniformly good for all sources and channel capacities.

Once the coding overhead factors $\{\theta_p: p=1, \ldots, P\}$ have been found (this can be done off-line and is not part of the encoding algorithm), system optimization may proceed. For a given bit-plane to layers allocation defined by the integers $\{\pi_{i,l}\}$ (see FIG. 3), the number of coded bpp is given by:

$$b = \sum_{i=1}^{s}\sum_{l=1}^{L}\sum_{p=\pi_{i,l-1}+1}^{\pi_{i,l}} \frac{H_p^{(i)}(1+\theta_p)}{C_l}. \tag{18}$$

This is the same bandwidth efficiency corresponding to ideal channel coding (zero overhead), and a modified quantizer operational R-D function characterized by the set of R-D points:

$$\left(\sum_{j=1}^{p} H_j^{(i)}(1+\theta_j), D_{Q,i}(p)\right), p = 1, \ldots, P. \tag{19}$$

It follows that the corresponding system optimization problems are formally identical to what given before, in the case of ideal channel coding, e.g., letting $\theta_l=0$ in (17), with the piecewise linear R-D functions (15) defined for the modified R-D points.

EXAMPLES

As an example of the application of the system optimization framework developed above, we consider the case of lossy multicasting of digital (gray-scale) images over the BEBC. Two embodiments are designed according to the MMDP criterion. The former is based on the concatenation of a state-of-the art image coder, JPEG2000, with standard non-systematic Raptor codes. The latter is based on scalar quantization with linear index coding, as presented above.

JPEG2000 and Raptor codes—this case can be cast within the problem formulation set forth above, for a single source component (s=1) and where JPEG2000 plays the role of the successive refinement source code. JPEG2000 produces a bit-stream of source-encoded bits with the property that the encoder output for any given bit rate is a prefix of the output for any higher bit rate. For a given source image we can generate a set of R-D points by considering an increasing number of JPEG2000 output bits, sequentially. We considered the points $(r_p, d_p)$ on the successive refinement R-D curve generated by applying JPEG2000 to the test image that we wish to encode. In particular, we considered the rate points $\{r_p: p=1, \ldots, P\}$ uniformly spaced in the interval [0.001; 1.2]. The lower convex envelope of the straight lines interpolating these points defines the operational R-D function $R_{jpeg}(D)$ of the source encoder.

For the MMDP problem, since the "true" R-D function of a given test image is not defined, we consider the operational single-user bounds $D_l^{opt}=R_{jpeg}^{-1}(bC_l)$. The solution of the system optimization problem yields a set of user distortions $\{D_l: l=1, \ldots, L\}$. Correspondingly, the JPEG2000 encoder produces L successive refinement layers of size $m_l=k$ ($R_{jpeg}(D_l)-R_{jpeg}(D_{l-1})$), where $R_{jpeg}(D_0)=0$. Eventually, each l-th layer output by the JPEG2000 encoder is mapped into a channel codeword of length $n_l=m_l(1+\theta_l)/C_l$ by the Raptor encoder, and the L codewords are transmitted in sequence over the BEBC. The degree sequence and the LDPC precoder for the Raptor code used in this example are set forth in Appendix A. Raptor codes over the binary-erasure channel have an overhead $\theta_l$ that depends on the coding block length but it is independent of the channel erasure probability. For the Raptor code ensemble used here and block lengths of the example, the overhead is θ=0.065.

JPEG2000 produces a header containing very sensitive information, the loss of which prevents from reconstructing the source at any level of refinement. In this example, the header is formed by 255 bytes. The header information was separately encoded using channel coding rate 0.1 (much lower than the worst user capacity $C_1$ for which the technique is optimized), so that the header is decoded by all users with negligible probability of error. The encoded header accounts for less than 5% of the overall bandwidth efficiency.

Quantization with linear index coding—in this case, the source image is decomposed into a set of "parallel" source components by a suitable linear transform. In this example, the DWT of JPEG2000 set forth above was used. Using W levels of DWT, the transformed image is partitioned into 3 W+1 "subbands". FIG. 6 is a block diagram showing DWT subband decomposition and corresponding source component blocks considered in the numerical example. The shaded blocks are actually encoded (non-zero rate) while the others are discarded, as a result of the MMDP system optimization for L=3, user capacities, $C_1$=0.3645, $C_2$=0.6, $C_3$=0.9 and b=0.5. The subband decomposition example shown in FIG. 6 is for W=3. This produces 3 W+1=10 subbands, which in the figure are indicated by LL0, HL1, LH1, HH1, HL2, LH2, HH2, HL3, LH3, HH3, respectively. The subbands have different lengths, all multiples of the LL0 subband length. For simplicity, we partition the whole DWT coefficient array into source component blocks of the same size of the LL0 subband. This yields $s=2^{2w}$ source component blocks of equal length $k=N^2/s$, where N×N indicates the size of the original image. The MSE distortion is given by a weighted sum of subband distortions, where the weights correspond to the $l_2$-norm of the synthesis filters impulse responses. For W=3, the weight of a source component block in subband w={1, . . . , 10} is given by the w-th coefficient of the vector [$1^6$, $1^5$h, $1^5$h, $1^4h^2$, $1^3h^3$, $1^3h^3$, $1^2h^2$, 1h, 1h, $h^2$], where, for the particular wavelet we have considered here (e.g., the CDF 9/7 wavelet used by JPEG2000 for lossy compression), l=1.96 and h=2.08.

Similarly to the case of parallel Gaussian sources, each source component block may be independently quantized using a suitably optimized non-uniform embedded scalar quantizer. Then, the quantized bit-planes are linearly encoded using a systematic Raptor encoder (again, the Raptor degree sequence and LDPC precoder for this example are given in Appendix A). The quantizer R-D points are obtained by measuring the actual quantizer distortion on each source component block. In this example, for a test image of size 1024×1024 with DWT depth W=3 we have source component blocks of length k=16384, which coincides with the size of the LL0 subband.

The multi-stage BP decoder needs the knowledge of the conditional bit-plane pmfs for each source component. While for the parallel Gaussian source model these probabilities are known a priori, in the case of digital images this must be estimated from the sequence of quantized DWT coefficients. In conventional source coding schemes (e.g., JPEG2000) these probabilities are implicitly estimated by using sequential probability estimators implemented together with the bit-plane context model and arithmetic coding. With linear index coding, these probabilities may be estimated by ML probability estimators and encoded into a header. The corresponding a-priori LLRs defined above are encoded and suitably quantized by using a number of bits dictated by the Rissanen bound, as discussed above. The bit-plane a-priori probabilities and the source components empirical variances and means form the header information for the linear index coding scheme. In this example, the header for linear index coding is formed by 255 bytes, as for the corresponding JPEG2000 case, and it is separately encoded with channel coding rate 0.1. Thus, the header information overhead is identical for both schemes.

A test system was used with L=3 users with capacities $C_1$=0.3645, $C_2$=0.6 and $C_3$=0.9 and a target bandwidth efficiency of b=0.5 channel-coded bits per pixel. The standard test image Lena was used with a size of 1024×1024, with grey-scale 8-bit pixels. For the linear index coding scheme, 3 levels of DWT are used. The solution of the MMDP problem yields that only the shaded source blocks in FIG. 6 are effectively encoded, i.e., are allocated non-zero rate for at least the fundamental layer. All the other source blocks are reconstructed at their mean values.

Figure 7:
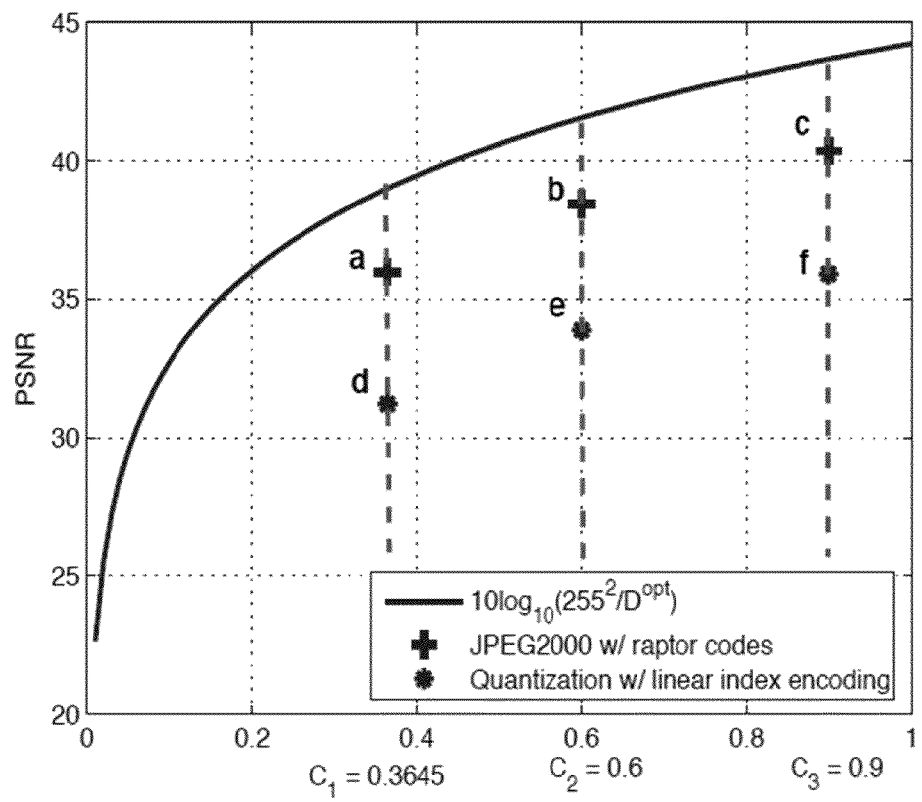
FIG. 7 is a graph showing reconstruction peak signal-to-noise ratio (PSNR) versus channel capacity.

FIG. 7 is a graph showing reconstruction peak signal-to-noise ratio (PSNR) versus channel capacity. R-D operating points are shown for three users, corresponding to the MMDP solution for the two embodiments described above compared with the single-user bound for b=0.5. For both embodiments, the solution of the MMDP problem yields a constant PSNR gap from the single-user bound. The gain of the concatenated JPEG2000/Raptor scheme over the linear index coding scheme is consistent with the gain shown in the pure compression case. This shows that the performance loss of the latter is entirely due to the quantization, while linear index coding with multi-stage BP decoding and soft-bit reconstruction performs very close to the theoretical limits.

Figure 8:
FIG. 8 shows reconstructed image snapshots for a range of capacity values for a JPEG2000/Raptor embodiment (top) and a quantization with linear index coding embodiment (bottom)
Figure 9:
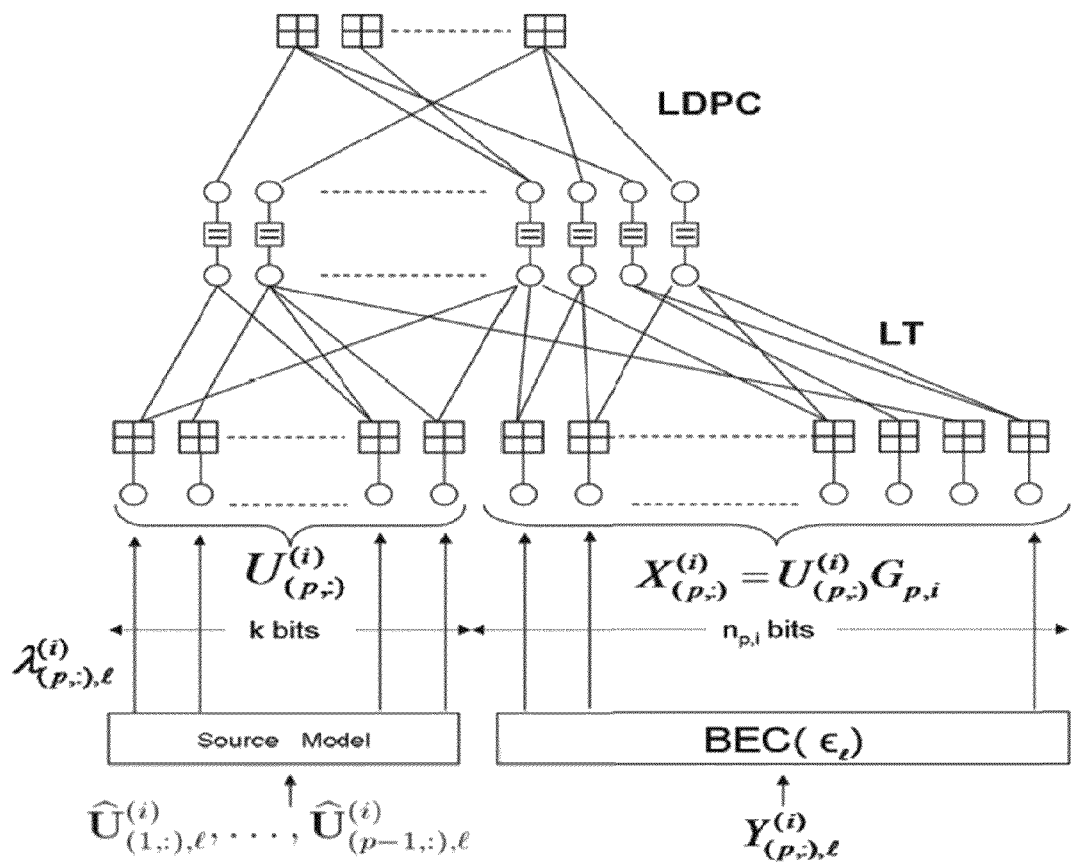
FIG. 9 is a Tanner graph of systematic Raptor codes.

FIG. 8 shows reconstructed image snapshots (only a detail is shown for better understanding) for the following capacity values (from left to right) C=[0.3000, 0.3143, 0.3215, 0.3502, 0.3573, 0.3611, 0.3645, 0.6000, 0.9000] for JPEG2000/Raptor scheme (top) and the quantization with linear index coding scheme (bottom). The three rightmost images in both rows correspond to the target distortions for the three users at capacities $C_1$=0.3645, $C_2$=0.6000 and $C_3$=0.9000 (note that these images correspond to points a, b, c, d, e, f in FIG. 7). The other snapshots correspond to the mismatch region C ∈[0.3, 0.3645]. Snapshots of the reconstructed image at the three users are shown in the three rightmost images of FIG. 8 for the JPEG2000-based scheme (top line) and the linear index coding scheme (bottom line).

Robustness to mismatched channel capacity—as anticipated, the main advantage of linear index coding consists of its robustness to residual post-decoding erasures. In order to illustrate this aspect, we consider the case of a mismatched user with channel capacity less than the minimum channel capacity C1 for which the system is designed. We simulated the performances of the systems designed for the nominal capacities $C_1$, $C_2$, $C_3$ given before, over a BEC with capacity C varying in an interval [$C_0$, $C_3$], with $C_0$<$C_1$. For C ∈[$C_0$, $C_1$], the system transmits at rate above the channel capacity. Therefore, even the fundamental layer (layer 1) operates "above threshold", and it is affected by a very large number of post-decoding erasures.

FIG. 8 shows snapshots of the reconstructed images (detail) for increasing values of C for the case of JPEG2000 with Raptor coding and quantization with linear index coding. The JPEG2000/Raptor scheme shows a very sharp degradation as soon as C drops below the target nominal design value $C_1$, due to the very sharp "waterfall" behavior of the Raptor code and to the lack of robustness of a conventional source coding scheme to residual erasures. The post-decoding erasure rate for C<$C_1$ is close to 1−C, i.e., more than 64% of the source-coded bits are erased in this case. This is so large that the source decoder fails to reconstruct the image despite all the "resilience" tools of JPEG2000. In contrast, the scheme based on embedded scalar quantization and linear index coding shows a much smoother transition, qualitatively similar to the behavior of "analog" transmission. Even for values of C significantly smaller than the design capacity $C_1$ the reconstructed image has some non-trivial subjective quality.

For the above experiments the "kakadu" open source JPEG2000 image coder was used. The error resilience tools provided by the JPEG2000 standard (i.e., the SOP, SEG-MARK, ERTERM and RESTART strategies) were enabled. In particular, with RESTART, the context statistics was restarted at the beginning of each coding pass. With ERTERM, the encoder enforces a predictable termination policy for the entropy coder. With SEGMARK, a special symbol was encoded at the end of each bit-plane. With SOP start of packet markers were inserted in front of every packet. At the decoder side the kakadu "resilient" feature was enabled, in order to obtain the best possible result. The codeblock size used was the standard in kakadu, i.e., 32×32.

It should be understood that many variations are possible based on the disclosure herein. Although features and elements are described above in particular combinations, each feature or element may be used alone without the other features and elements or in various combinations with or without other features and elements. The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on non-transitory computer readable media). The results of such processing may be maskworks that are then used in a semiconductor manufacturing process to manufacture a processor which implements aspects of the present invention.

What is claimed is:

1. A digital multicast system including a source channel encoder configured to multicast a digital multimedia source to a plurality of remote terminals each having a source channel decoder, the system comprising:
the source channel encoder comprising:
a linear transform encoder configured to generate a plurality of source components;
a successive refinement quantizer configured to generate a plurality of bit planes based on the source components (for each), wherein the linear transform encoder and the successive refinement quantizer are optimized for the digital multimedia source; and
a systematic linear encoder configured to map the bit planes into channel-encoded symbols configured for multicasting to the plurality of remote terminals;
the source channel decoder comprising:
a plurality of Belief Propagation (BP) decoders configured for successive decoding of the channel-encoded symbols, each BP decoder being associated with a single bit plane and being configured to generate a soft estimate of the bit plane based on an a-posteriori Log-Likelihood Ratio (LLR); and
a reconstruction engine configured to produce an estimate of a source sample based on the a-posteriori LRRs generated by the BP decoders using minimum mean-square error (MMSE) criterion.

2. The source channel encoder of claim 1 wherein the linear transform encoder is configured to apply a Discrete Cosine Transform (DCT).

3. The source channel encoder of claim 1 wherein the linear transform encoder is configured to apply a Discrete Wavelet Transform (DWT).

4. The source channel encoder of claim 1 wherein the linear transform encoder is configured for differential encoding.

5. The source channel encoder of claim 1 wherein the quantizer is configured to generate a top (most significant) bit plane and a plurality of lower significance bit planes configured with decreasing resolution.

6. The source channel encoder of claim 1 wherein the systematic linear encoder comprises a Raptor encoder.

7. The source channel encoder of claim 1 wherein the systematic linear encoder is configured to directly map the bits planes into the channel-encoded symbols.

8. The source channel encoder of claim 1 wherein the systematic linear encoder is configured to generate a minimum number of channel coded symbols based on a pre-determined distortion level.

9. The source channel encoder of claim 1 wherein the systematic linear encoder is configured to minimize a weighted sum of distortion levels based on a pre-determined number of channel coded symbols.

10. The source channel encoder of claim 1 wherein the systematic linear encoder is configured to minimize a maximum gap with respect to individual optimal distortion across all users based on a pre-determined number of channel coded symbols.

11. The source channel decoder of claim 1 wherein the BP decoders are configured to generate a hard estimate based on a Maximum A-posteriori Probability (MAP).

12. The source channel decoder of claim 11 wherein the hard estimate is passed to a successive BP decoder stage.

13. A digital multicast method including encoding a digital multimedia source for multicasting to a plurality of remote terminals, each having a source channel decoder, the method comprising:
transforming the source using a linear transform and generating a plurality of source components;
performing successive refinement quantization and generating a plurality of bit planes based on the source components, wherein the linear transform and the successive refinement quantization are optimized for the digital multimedia source; and
performing systematic linear encoding to map the bit planes into channel-encoded symbols configured for multicasting to the plurality of remote terminals;
receiving the channel-encoded symbols at the remote terminal and successively decoding a plurality of bit planes and generating a soft estimate of each bit plane based on an a-posteriori Log-Likelihood Ratio (LLR); and
generating an estimate of a source sample based on the a-posteriori LRRs using minimum mean-square error (MMSE) criterion.

14. The method of claim 13 wherein the linear transform is a Discrete Cosine Transform (DCT).

15. The method of claim 13 wherein the linear transform is a Discrete Wavelet Transform (DWT).

16. The method of claim 13 wherein the linear transform generates differential encoding.

17. The method of claim 13 further comprising generating a top (most significant) bit plane and a plurality of lower significance bit planes configured with decreasing resolution.

18. The method of claim 13 further comprising performing Raptor encoding.

19. The method of claim 13 wherein the bits planes are directly mapped into the channel-encoded symbols.

20. The method of claim 13 further comprising generating a minimum number of channel coded symbols based on a pre-determined distortion level.

21. The method of claim 13 further comprising minimizing a weighted sum of distortion levels based on a pre-determined number of channel coded symbols.

22. The method of claim 13 further comprising minimizing a maximum gap with respect to individual optimal distortion across all users based on a pre-determined number of channel coded symbols.

23. The method of claim 13 further comprising generating a hard estimate based on a Maximum A-posteriori Probability (MAP).

24. The method of claim 23 wherein the hard estimate is passed to a successive decoder stage.

\* \* \* \* \*